US012573107B2

(12) United States Patent
Toizumi

(10) Patent No.: US 12,573,107 B2
(45) Date of Patent: Mar. 10, 2026

(54) LAYOUT SUPPORT SYSTEM, LAYOUT SUPPORT APPARATUS, INFORMATION ACCUMULATION APPARATUS, AND STORAGE MEDIUM

(71) Applicant: NEC Corporation, Tokyo (JP)

(72) Inventor: Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 18/242,275

(22) Filed: Sep. 5, 2023

(65) Prior Publication Data

US 2024/0087192 A1     Mar. 14, 2024

(30) Foreign Application Priority Data

Sep. 12, 2022     (JP) ................................. 2022-144754

(51) Int. Cl.
| | |
|---|---|
| *G06T 11/60* | (2006.01) |
| *G06V 10/74* | (2022.01) |
| *G06V 30/414* | (2022.01) |

(52) U.S. Cl.
CPC ............ *G06T 11/60* (2013.01); *G06V 10/761* (2022.01); *G06V 30/414* (2022.01)

(58) Field of Classification Search
CPC ..... G06T 11/60; G06T 11/206; G06V 10/761; G06V 30/414; G06V 30/18057; G06V 30/19067
See application file for complete search history.

(56) References Cited

U.S. PATENT DOCUMENTS

| | | | | |
|---|---|---|---|---|
| 4,992,953 A | * | 2/1991 | Yoshida ................... | G06F 30/13 |
| | | | | 703/1 |
| 8,826,131 B2 | * | 9/2014 | Suito ................... | H04N 21/8153 |
| | | | | 715/810 |
| 11,016,792 B1 | * | 5/2021 | Vilke ....................... | G06F 9/452 |
| 2015/0234558 A1 | * | 8/2015 | Ichikawa .............. | G06F 3/0481 |
| | | | | 715/788 |
| 2015/0294488 A1 | * | 10/2015 | Iwasaki ................. | G06T 11/206 |
| | | | | 345/440 |
| 2016/0055662 A1 | * | 2/2016 | Tomidokoro ....... | G06F 16/4393 |
| | | | | 345/634 |
| 2018/0164964 A1 | * | 6/2018 | Hori ...................... | G06F 3/0483 |

(Continued)

FOREIGN PATENT DOCUMENTS

| | | |
|---|---|---|
| JP | H08-255160 A | 10/1996 |
| JP | 2009-230260 A | 10/2009 |

(Continued)

*Primary Examiner* — Jin Cheng Wang
(74) *Attorney, Agent, or Firm* — Sughrue Mion, PLLC

(57) ABSTRACT

This invention contributes to improvement in efficiency in generation of a layout. A layout support system includes: an information accumulation apparatus that extracts image feature vectors of a plurality of existing contents and stores, in a database, the image feature vectors in association with pieces of layout information; and a layout support apparatus that detects, on the basis of similarities between the image feature vectors stored in the database and a comparative feature vector generated for a target content, a piece of layout information matching the target content, from among the pieces of layout information stored in the database. The layout support system can support decision-making regarding layout determination.

8 Claims, 10 Drawing Sheets

| CONSTITUENT ELEMENT | ORDER OF PRIORITY |
|---|---|
| A1 | 1 |
| A2 | 2 |
| A3 | 3 |
| A4 | 4 |
| A5 | 5 |

| CONSTITUENT ELEMENT | POSITION AND RANGE |
|---|---|
| A1 | (x1, x2), (x3, x4), (x5, x6), (x7, x8), |
| A2 | ... |
| A3 | ... |
| A4 | ... |
| A5 | ... |

(56)       References Cited

U.S. PATENT DOCUMENTS

2019/0205072 A1*   7/2019   Kowata ................. G06F 3/1243
2021/0042066 A1*   2/2021   Kitabatake ........... H04N 1/0019
2022/0036859 A1*   2/2022   Tokuchi ............... G06F 3/0488
2022/0291818 A1*   9/2022   Lee ....................... G06F 1/1616
2022/0309648 A1*   9/2022   Chae .................... G06V 10/774
2023/0018279 A1*   1/2023   Wei ..................... G06F 9/45558

FOREIGN PATENT DOCUMENTS

JP              5506176  B     5/2014
JP        2015-130114  A     7/2015
JP        2018-067153  A     4/2018
JP        2019-504428  A     2/2019
JP        2019-505936  A     2/2019
JP        2019-523927  A     8/2019
JP        2020-057381  A     4/2020
WO        2022/049657  A1    3/2022

* cited by examiner

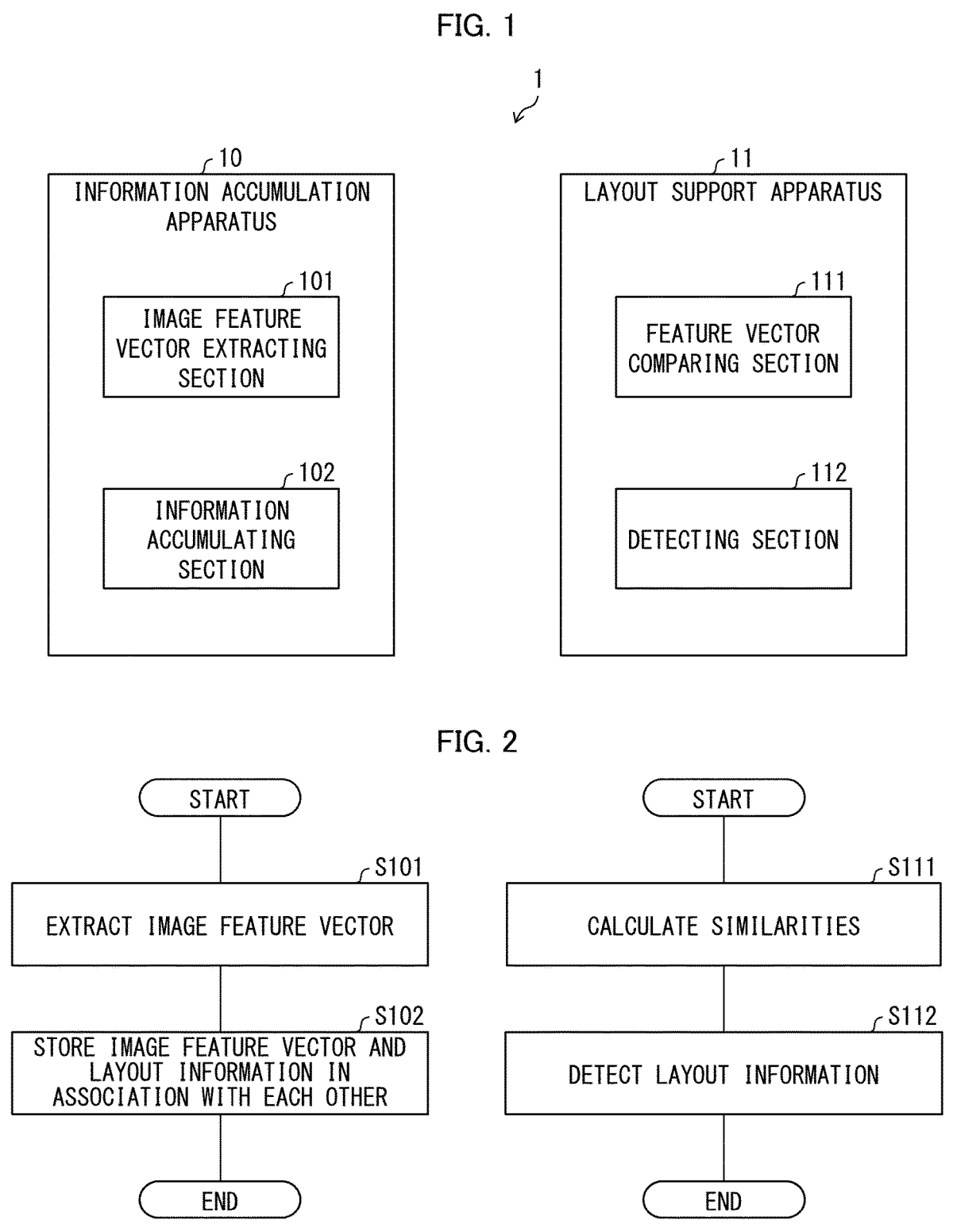

| 10 |
|---|
| INFORMATION ACCUMULATION APPARATUS |
| 101 |
| IMAGE FEATURE VECTOR EXTRACTING SECTION |
| 102 |
| INFORMATION ACCUMULATING SECTION |

| 11 |
|---|
| LAYOUT SUPPORT APPARATUS |
| 111 |
| FEATURE VECTOR COMPARING SECTION |
| 112 |
| DETECTING SECTION |

FIG. 2

START

S101
EXTRACT IMAGE FEATURE VECTOR

S102
STORE IMAGE FEATURE VECTOR AND LAYOUT INFORMATION IN ASSOCIATION WITH EACH OTHER

END

START

S111
CALCULATE SIMILARITIES

S112
DETECT LAYOUT INFORMATION

END

FIG. 6
| CONSTITUENT ELEMENT | ORDER OF PRIORITY |
|---|---|
| A1 | 1 |
| A2 | 2 |
| A3 | 3 |
| A4 | 4 |
| A5 | 5 |
| CONSTITUENT ELEMENT | POSITION AND RANGE |
|---|---|
| A1 | (x1, x2), (x3, x4), (x5, x6), (x7, x8), |
| A2 | ... |
| A3 | ... |
| A4 | ... |
| A5 | ... |
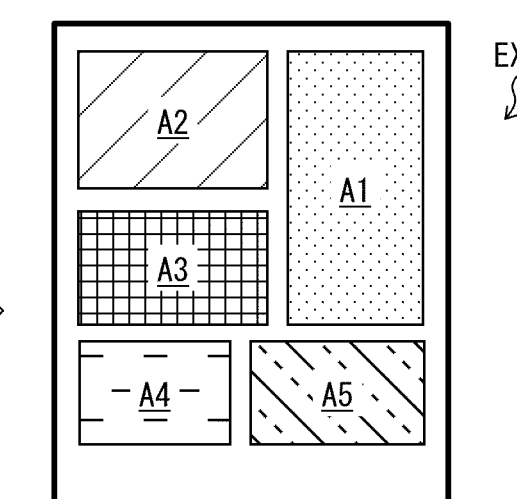
EX1
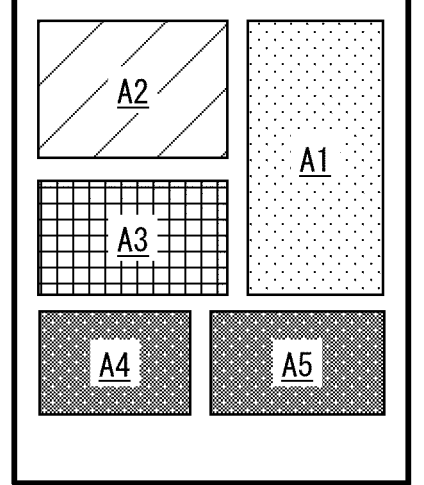
EX2

FIG. 11

```
       ┌──────────┐
       │  START   │
       └────┬─────┘
            │
┌───────────────────────────┐
│  OBTAIN TARGET CONTENT     │  S241
│        INFORMATION         │
└───────────┬───────────────┘
            │
┌───────────────────────────┐
│ GENERATE COMPARATIVE FEATURE│  S242
│           VECTOR            │
└───────────┬───────────────┘
            │
┌───────────────────────────┐
│    CALCULATE SIMILARITIES  │  S243
└───────────┬───────────────┘
            │
┌───────────────────────────┐
│   DETECT LAYOUT INFORMATION│  S244
└───────────┬───────────────┘
            │
┌───────────────────────────┐
│   DISPLAY DETECTION RESULT │  S245
└───────────┬───────────────┘
            │
       ┌──────────┐
       │   END    │
       └──────────┘
```

FIG. 12

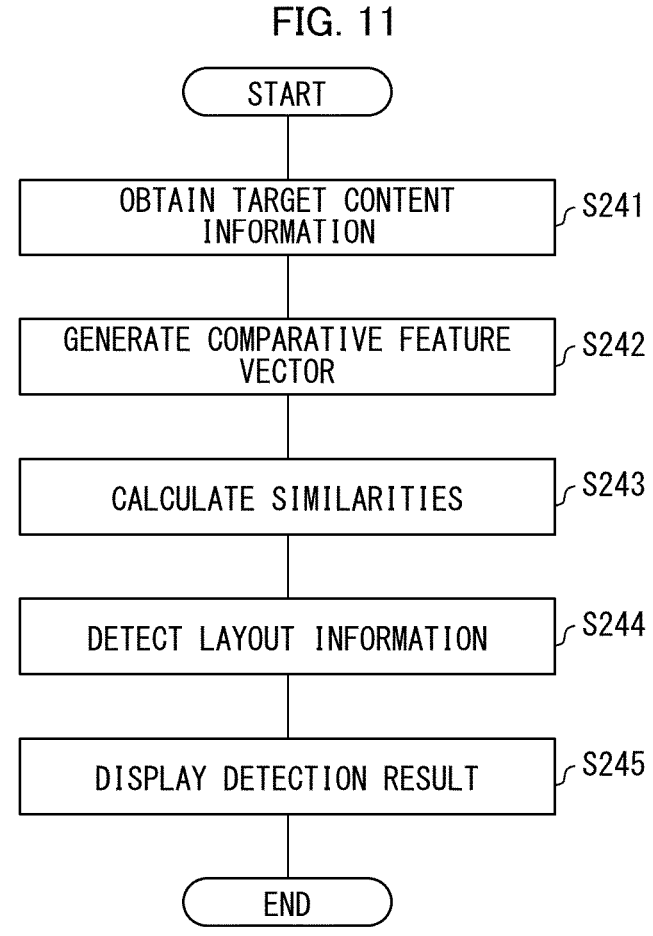

LAYOUT SUPPORT SYSTEM, LAYOUT SUPPORT APPARATUS, INFORMATION ACCUMULATION APPARATUS, AND STORAGE MEDIUM

This application is based upon and claims the benefit of priority from Japanese Patent Application No. 2022-144754 filed on Sep. 12, 2022, the disclosure of which is incorporated herein in its entirety by reference.

TECHNICAL FIELD

The present invention relates to a layout support system and the like supporting preparation of a layout of constituent elements in a paper medium or a web page including information such as news.

BACKGROUND ART

Conventionally, a layout of an article on a paper medium including information such as news has been prepared with human aid. There has been a demand for a technique that can save labor and improve efficiency in the work. One of the documents disclosing such a technique is, for example, Patent Literature 1 indicated below.

Patent Literature 1 discloses generating a scoring model by using, as correct data, a layout image of an existing document page prepared with human aid and using, as incorrect data, a false layout image in which the layout of the document page is randomly replaced with another one. An information processing apparatus disclosed in Patent Literature 1 evaluates an automatically-generated layout image with use of the scoring model, and automatically determines an appropriate layout on the basis of a result of the evaluation.

CITATION LIST

Patent Literature

[Patent Literature 1]
Japanese Patent Application Publication, Tokukai, No. 2020□057381

SUMMARY OF INVENTION

Technical Problem

The technique disclosed in Patent Literature 1 has room for improvement in terms of efficiency. Specifically, in automatic generation of a layout image, the technique disclosed in Patent Literature 1 generates the layout image with use of positioning coordinates randomly determined. Thus, generation of a large number of clearly inappropriate layout images is expected. The inappropriate layout images need to be evaluated one by one by the scoring model. This is inefficient.

An example aspect of the present invention was made in view of the above problem, and has an example object to provide a technique contributing to improvement in efficiency in generation of a layout.

Solution to Problem

A layout support system in accordance with an example aspect of the present invention includes: an information accumulation apparatus that includes at least one processor, the at least one processor executing, for each of a plurality of existing contents, a process of extracting an image feature vector (image feature quantity) from an image indicating a layout of constituent elements of the existing content and orders of priority set to the constituent elements and a process of storing, in a database, the image feature vector and a piece of layout information indicating the layout of the constituent elements in such a manner that the image feature vector and the piece of layout information are in association with each other; and a layout support apparatus that includes at least one processor, the at least one processor executing a process of calculating similarities between the image feature vectors stored in the database and a comparative feature vector generated on a basis of target content information indicating at least orders of priority set to constituent elements constituting a target content which is a target to be laid out and a process of detecting, on a basis of the similarities, a piece of layout information matching the target content, from among the pieces of layout information stored in the database.

A layout support apparatus in accordance with an example aspect of the present invention includes at least one processor, the at least one processor executing: for each of a plurality of existing contents, a feature vector comparing process of (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other and (b) calculating similarities between the image feature vectors stored in the database and a comparative feature vector generated on a basis of target content information indicating at least orders of priority set to constituent elements constituting a target content which is a target to be laid out; and a detecting process of detecting, on a basis of the similarities, a piece of layout information matching the target content, from among the pieces of layout information of the plurality of existing contents.

An information accumulation apparatus in accordance with an example aspect of the present invention includes at least one processor, the at least one processor executing, for each of a plurality of existing contents, an image feature vector extracting process of extracting an image feature vector from an image indicating (i) a layout of constituent elements constituting the existing content and (ii) orders of priority set to the constituent elements; and an information accumulating process of storing, in a database, the image feature vector and a piece of layout information indicating the layout of the constituent elements in such a manner that the image feature vector and the piece of layout information are in association with each other.

Advantageous Effects of Invention

According to an example aspect of the present invention, it is possible to contribute to improvement in efficiency in generation of a layout.

BRIEF DESCRIPTION OF DRAWINGS

FIG. 1 is a block diagram illustrating a configuration of a layout support system in accordance with a first example embodiment of the present invention.

FIG. 2 is a flowchart illustrating a flow of an information accumulation method and a layout support method in accordance with the first example embodiment of the present invention.

FIG. 6 is a view illustrating an example of generation of an image carried out by an image generating section.

FIG. 11 is a flowchart illustrating a flow of processes to be executed by the layout support apparatus to carry out layout support of a target content.

FIG. 12 is a view illustrating an example of a computer executing instructions of a program which is software realizing functions of the apparatuses in accordance with the example embodiments of the present invention.

DESCRIPTION OF EMBODIMENTS

First Example Embodiment

Figure 3:
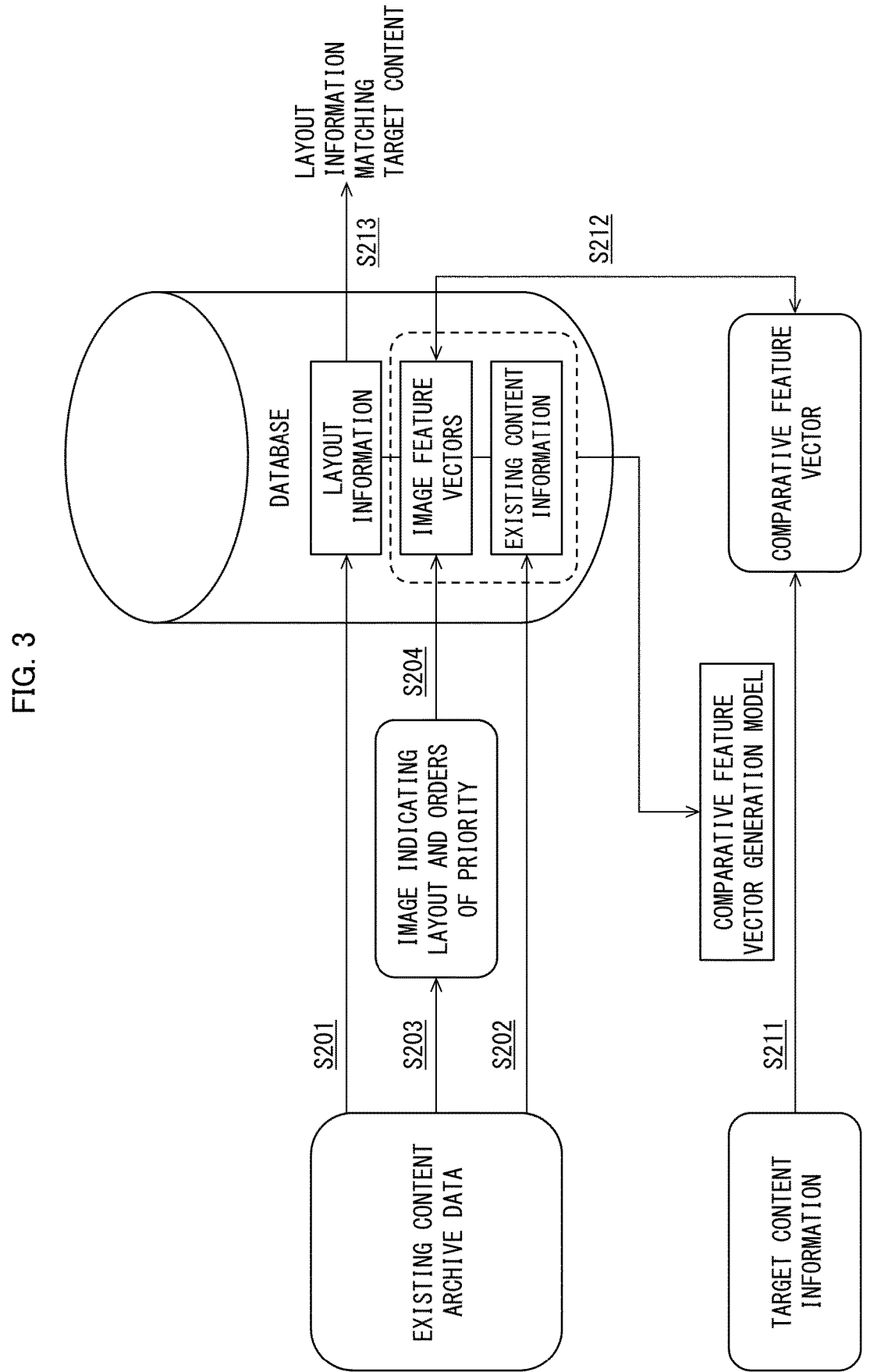
FIG. 3 is a view illustrating an outline of an information accumulation method and a layout support method in accordance with a second example embodiment of the present invention.

The following description will discuss a first example embodiment of the present invention in detail with reference to the drawings. The present example embodiment is a basic form of example embodiments described later.
(Configuration of Layout Support System)

The following will describe, with reference to FIG. 1, a configuration of a layout support system 1 in accordance with the present example embodiment. FIG. 1 is a block diagram illustrating a configuration of the layout support system 1. As shown in FIG. 1, the layout support system 1 includes an information accumulation apparatus 10 and a layout support apparatus 11.

Further, as shown in FIG. 1, the information accumulation apparatus 10 includes an image feature vector extracting section (image feature vector extracting means) 101 and an information accumulation section (information accumulating means) 102.

The image feature vector extracting section 101 extracts, for each of a plurality of existing contents, an image feature vector from an image indicating (i) a layout of constituent elements constituting the existing content and (ii) orders of priority set to the constituent elements.

The information accumulation section 102 stores, in a database, the image feature vectors extracted by the image feature vector extracting section 101 and pieces of layout information each indicating a layout of constituent elements of a corresponding one of the existing contents in such a manner that the image feature vectors and the pieces of layout information are in association with each other.

As described above, the information accumulation apparatus 10 in accordance with the present example embodiment includes: the image feature vector extracting section

101 that extracts, for each of a plurality of existing contents, an image feature vector from an image indicating (i) a layout of constituent elements constituting the existing content and (ii) orders of priority set to the constituent elements; and the information accumulation section 102 stores, in a database, the image feature vectors and pieces of layout information in such a manner that the image feature vectors and the pieces of layout information are in association with each other. Therefore, with the information accumulation apparatus 10 in accordance with the present example embodiment, it is possible to attain an effect of making it possible to contribute to improvement in efficiency in generation of a layout.

Further, as shown in FIG. 1, the layout support apparatus 11 includes a feature vector comparing section (feature vector comparing means) 111 and a detecting section (detecting means) 112.

The feature vector comparing section 111 refers to, for each of the plurality of existing contents, the database in which (i) the pieces of layout information each indicating the layout of the constituent elements constituting the corresponding one of the existing contents and (ii) the image feature vectors each extracted from the image indicating the layout and the orders of priority set to the constituent elements are stored in association with each other. Then, the feature vector comparing section 111 calculates similarities between the image feature vectors stored in the database and a comparative feature vector generated on the basis of target content information indicating at least orders of priority set to constituent elements constituting a target content which is a target to be laid out.

The detecting section 112 detects, on the basis of the similarities calculated by the feature vector comparing section 111, a piece of layout information matching the target content, from among the pieces of layout information of the plurality of existing contents.

As described above, the layout support apparatus 11 in accordance with the present example embodiment includes: the feature vector comparing section 111 that (a) refers to, for each of a plurality of existing contents, a database in which (i) pieces of layout information each indicating a layout of constituent elements constituting a corresponding one of the existing contents and (ii) image feature vectors each extracted from an image indicating the layout and orders of priority set to the constituent elements are stored in association with each other, and (b) calculates similarities between the image feature vectors stored in the database and a comparative feature vector generated on the basis of target content information indicating at least orders of priority set to constituent elements constituting a target content which is a target to be laid out; and the detecting section 112 that detects, on the basis of the similarities calculated by the feature vector comparing section 111, a piece of layout information matching the target content, from among the pieces of layout information of the plurality of existing contents. Therefore, with the layout support apparatus 11 in accordance with the present example embodiment, it is possible to attain an effect of making it possible to contribute to improvement in efficiency in generation of a layout.

As described above, the layout support system 1 in accordance with the present example embodiment includes: the information accumulation apparatus 10 that (a) extracts, for each of a plurality of existing contents, an image feature vector from an image indicating (i) a layout of constituent elements constituting the existing content and (ii) orders of priority set to the constituent elements and (b) stores, in a database, the image feature vectors and pieces of layout information in such a manner that the image feature vectors and the pieces of layout information are in association with each other; and the layout support apparatus 11 that (a) calculates similarities between the image feature vectors stored in the database and a comparative feature vector generated on the basis of target content information indicating at least orders of priority set to the constituent elements constituting a target content which is a target to be laid out and (b) detects, on the basis of the similarities, a piece of layout information matching the target content, from among the pieces of layout information stored in the database. Therefore, with the layout support system 1 in accordance with the present example embodiment, it is possible to attain an effect of making it possible to contribute to improvement in efficiency in generation of a layout.

(Information Accumulation Program/Layout Support Program)

The functions of the above-described information accumulation apparatus 10 can also be realized by a program. An information accumulation program in accordance with the present example embodiment causes a computer to function as the above-described image feature vector extracting section 101 and the above-described information accumulation section 102. Therefore, with the information accumulation program in accordance with the present example embodiment, it is possible to attain an effect of making it possible to contribute to improvement in efficiency in generation of a layout.

Similarly, the functions of the above-described layout support apparatus 11 can also be realized by a program. The layout support program in accordance with the present example embodiment causes a computer to function as: the feature vector comparing section 111 that (a) refers to, for each of a plurality of existing contents, a database in which pieces of layout information each indicating a layout of constituent elements constituting a corresponding one of the existing contents and image feature vectors each extracted from an image indicating the layout and orders of priority set to the constituent elements are stored in association with each other and (b) calculates similarities between the image feature vectors stored in the database and a comparative feature vector generated on the basis of target content information indicating at least orders of priority set to the constituent elements constituting a target content which is a target to be laid out; and the detecting section 112 detects, on the basis of the similarities calculated by the feature vector comparing section 111, a piece of layout information matching the target content, from among the pieces of layout information of the plurality of existing contents. Therefore, with the layout support program in accordance with the present example embodiment, it is possible to attain an effect of making it possible to contribute to improvement in efficiency in generation of a layout.

(Flow of Information Accumulation Method and Layout Support Method)

The following will describe, with reference to FIG. 2, a flow of an information accumulation method and a layout support method in accordance with the present example embodiment. FIG. 2 is a flowchart illustrating a flow of the information accumulation method and the layout support method. Note that steps shown in FIG. 2 may be carried out by a processor of the information accumulation apparatus 10 or the layout support apparatus 11 or by a processor of another apparatus. Alternatively, the steps may be carried out by processors provided in respective different apparatuses.

In S101, at least one processor extracts an image feature vector from an image indicating (i) a layout of constituent elements constituting an existing content and (ii) orders of priority set to the constituent elements.

In S102, at least one processor stores, in a database, the image feature vector extracted in S101 and a piece of layout information indicating a layout of the constituent elements of the existing content in such a manner that the image feature vector and the piece of layout information are in association with each other. The above-described processes in S101 and S102 are executed for each of a plurality of existing contents. Consequently, in the above-described database, image feature vectors and pieces of layout information corresponding to the plurality of existing contents are stored.

As described above, in the information accumulation method in accordance with the present example embodiment, at least one processor extracts, for each of a plurality of existing contents, an image feature vector from an image indicating (i) a layout of constituent elements constituting the existing content and (ii) orders of priority set to the constituent elements (S101); and stores, in a database, the image feature vectors thus extracted and pieces of layout information each indicating the layout of the constituent elements of a corresponding one of the plurality of existing contents in such a manner that the image feature vectors and the pieces of layout information are in association with each other (S102). Therefore, with the information accumulation method in accordance with the present example embodiment, it is possible to attain an effect of making it possible to contribute to improvement in efficiency in generation of a layout.

Meanwhile, in S111, at least one processor refers to, for each of the plurality of existing contents, the database in which (i) the pieces of layout information each indicating the layout of the constituent elements constituting a corresponding one of the plurality of existing contents and (ii) the image feature vectors each extracted from the image indicating the layout and the orders of priority set to the constituent elements are stored in association with each other; and calculates similarities between the image feature vectors stored in the database and a comparative feature vector generated on the basis of target content information indicating at least orders of priority set to constituent elements constituting a target content which is a target to be laid out.

In S112, at least one processor detects, on the basis of the similarities calculated in S111, a piece of layout information matching the target content, from among the pieces of layout information of the plurality of existing contents.

As described above, in the layout support method in accordance with the present example embodiment, at least one processor refers to, for each of a plurality of existing contents, a database in which (i) pieces of layout information each indicating a layout of constituent elements constituting a corresponding one of the plurality of existing contents and (ii) image feature vectors each extracted from an image indicating the layout and orders of priority set to the constituent elements are stored in association with each other, and calculates similarities between the image feature vectors stored in the database and a comparative feature vector generated on the basis of target content information indicating at least orders of priority set to constituent elements constituting a target content which is a target to be laid out (S111); and detects, on the basis of the similarities thus calculated, a piece of layout information matching the target content, from among the pieces of layout information of the plurality of existing contents (S112). Therefore, with the information accumulation method in accordance with the present example embodiment, it is possible to attain an effect of making it possible to contribute to improvement in efficiency in generation of a layout.

Second Example Embodiment (Configuration of Layout Support Method)

FIG. 3 is a view illustrating an outline of an information accumulation method and a layout support method in accordance with the present example embodiment. Processes in S201 to S204 shown in FIG. 3 are included in the information accumulation method, which stores, in a database, various pieces of information extracted from pieces of archive data of existing contents having undergone laying-out. Meanwhile, processes in S211 to S213 are included in the layout support method, which detects layout information indicating a layout matching a target content which is a target to be laid out. Note that these processes are executed by at least one processor.

In S201 in the information accumulation method, at least one processor extracts, from among the pieces of archive data of the existing contents, pieces of layout information indicating layouts of the existing contents.

The layout information only needs to be information indicating in which way constituent elements of an existing content are laid out. For example, the layout information may be information indicating positions and ranges of the constituent elements in a target area in which the constituent elements are to be laid out. In this case, the layout information may be, for example, the one indicating the positions and ranges of the constituent elements by coordinate values in a coordinate system set in the target area.

The existing content only needs to be the one including a plurality of constituent elements which are laid out in a given area. For example, the existing content may be a content, examples of which include a paper medium and a web page each including information such as news. Further, each of the constituent elements of the existing content may be distinguishable from another constituent element in terms of content. The definition of a "single constituent element" may be determined in advance. For example, a single article may be defined as a single constituent element. For another example, an article group constituted by a plurality of articles having contents related to each other may be defined as a single constituent element. For further another example, a single article may be defined as a single existing content. In this case, a title, a body, a photograph, a drawing, and/or the like constituting the article are constituent elements of the existing content.

In S202, at least one processor extracts, from among the pieces of archive data of the existing contents, pieces of existing content information indicating at least orders of priority set to constituent elements of the existing contents. Note that the existing content information may include information indicating contents of the constituent elements constituting the existing contents.

In S203, at least one processor generates an image indicating (i) a layout of constituent elements of an existing content and (ii) orders of priority of the constituent elements. The method for generating the images will be explained in "Method for Generating Image" described later.

In S204, image feature vectors are extracted from the images generated in S203. There is no particular limitation on a method for extracting the image feature vectors. For example, the image feature vectors may be extracted with use of an image feature vector extraction model generated by learning relations between various images and image feature vectors of the images. For example, the image feature vector extraction model may be a neural network model such as a Residual neural network (ResNet).

Then, at least one processor stores, in the database, the pieces of layout information extracted in S201, the image feature vectors extracted in S204, and the pieces of existing content information extracted in S202 in such a manner that the pieces of layout information, the image feature vectors, and the pieces of existing content information are in association with each other. Among these, combinations of the image feature vectors and the pieces of layout support method are used to detect a piece of layout information recommended in the layout support method. Meanwhile, combinations of the image feature vectors and the pieces of existing content information are used as training data used to generate and update a comparative feature vector generation model (described later). Thus, the combinations of the image feature vectors and the pieces of layout information and the combinations of the image feature vectors and the pieces of existing content information may be stored in respective different databases.

In S211 in the layout support method, at least one processor generates a comparative feature vector on the basis of target content information relating to a target content which is a target to be laid out. The target content information includes information indicating at least orders of priority set to the constituent elements constituting the target content. Note that the target content information may include information indicating contents of the constituent elements constituting the target content.

Generation of the comparative feature vector in S211 is carried out with use of the above-described comparative feature vector generation model (this will be described in detail later). Further, the comparative feature vector generated with use of the comparative feature vector generation model is a feature vector whose similarity with an image feature vector stored in the database can be calculated.

In S212, at least one processor calculate similarities between the comparative feature vector generated in S211 and the image feature vectors stored in the database. Note that the similarity is a value serving as an indicator indicating a degree of similarity. The similarities between the feature vectors may be calculated by any method. For example, in S212, cosine similarities between the comparative feature vector and the image feature vectors may be calculated.

In S213, at least one processor detects, on the basis of the similarities calculated in S212, a piece of layout information matching the target content, from among the pieces of layout information of the plurality of existing contents stored in the database.

As described above, the information accumulation method in accordance with the present example embodiment includes: at least one processor carrying out, for each of a plurality of existing contents, extracting an image feature vector from an image indicating (i) a layout of constituent elements constituting the existing content and (ii) orders of priority set to the constituent elements; and storing, in a database, the image feature vectors and pieces of layout information in such a manner that the image feature vectors and the pieces of layout information are in association with each other.

The layout support method in accordance with the present example embodiment includes: at least one processor calculating similarities between image feature vectors stored in a database and a comparative feature vector generated on the basis of target content information indicating at least orders of priority set to constituent elements constituting a target content which is a target to be laid out; and at least one processor detecting, on the basis of the similarities, a piece of layout information matching the target content, from among the pieces of layout information of the plurality of existing contents stored in the database.

It is highly likely that, in an existing content, constituent elements are laid out appropriately according to orders of priority thereof. Thus, with the above-described configuration, it is possible to detect layout information with which the constituent elements of the target content are highly likely to be laid out appropriately according to the order of priority thereof. Further, unlike Patent Literature 1, the above configuration would not generate a large number of layout images. Thus, the above configuration can contribute to improvement in efficiency in generation of a layout.

Further, with the information accumulation method in accordance with the present example embodiment, in a case where an existing content including a new layout is obtained, layout information and the like of the existing content can be added to the database. Therefore, with the layout support method in accordance with the present example embodiment, it is possible to utilize the new layout by referring to the database.

(Configuration of Information Accumulation Apparatus)

Figure 4:
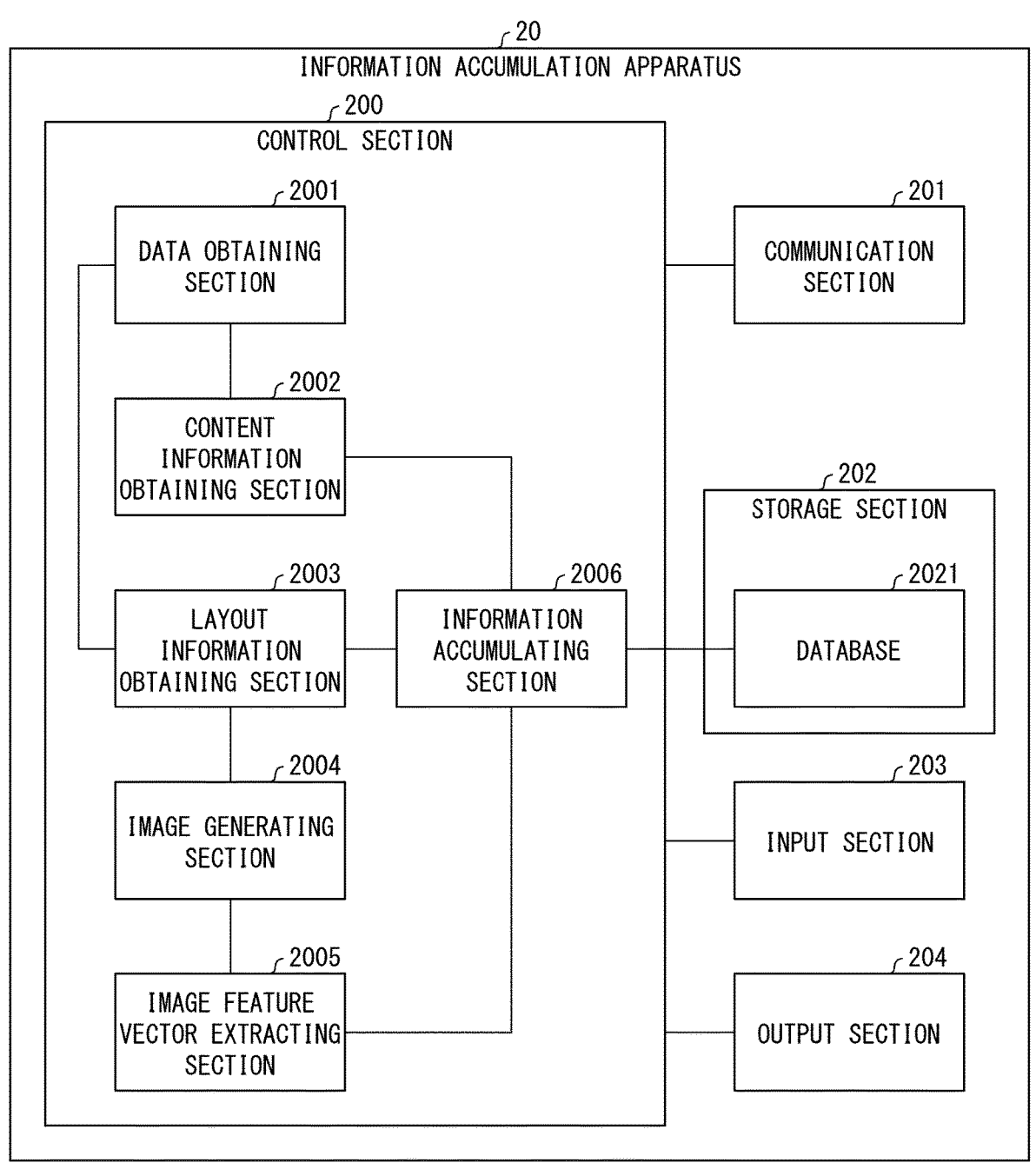
FIG. 4 is a block diagram illustrating an example of a configuration of an information accumulation apparatus in accordance with the second example embodiment of the present invention.

FIG. 4 is a block diagram illustrating an example of a configuration of the information accumulation apparatus 20 in accordance with the present example embodiment. As shown in FIG. 4, the information accumulation apparatus 20 includes: a control section 200 that comprehensively controls sections of the information accumulation apparatus 20; a communication section 201 via which communication with another apparatus is carried out; a storage section 202 in which various kinds of data is stored; an input section 203 that accepts an input operation: and an output section 204 that outputs data.

The control section 200 includes a data obtaining section 2001, a content information obtaining section 2002, a layout information obtaining section 2003, an image generating section 2004, an image feature vector extracting section 2005, and an information accumulation section 2006. The storage section 202 has a database 2021 stored therein. The image generating section 2004 will be explained in "Method for Generating Image" described later.

The data obtaining section 2001 obtains an existing content in which a plurality of constituent elements are laid out. For example, the data obtaining section 2001 may obtain the existing content from archive data, as in the example shown in FIG. 3. The existing content to be obtained by the data obtaining section 2001 may be, for example, image data of an image made from a page of a paper medium or a web page including information such as news.

Note that the data obtaining section 2001 preferably obtains an existing content of the same kind as target content which is a target of layout support carried out by a layout support apparatus 21. For example, in a case where the layout support apparatus 21 carries out layout support for a paper medium including information such as news, the data obtaining section 2001 preferably obtains, as an existing content, data of a paper medium including information such as news.

The content information obtaining section 2002 obtains existing content information of the existing content obtained by the data obtaining section 2001. The existing content information only needs to be the one including at least information indicating orders of priority of constituent elements constituting the existing content, and is preferably the one including information indicating contents of the constituent elements.

For example, in a case where the existing content is paper data in which a plurality of articles are laid out, the content information obtaining section 2002 may obtain existing content information including information indicating orders of priority of the articles. Further, the existing content information may include, as the information indicating the contents of the constituent elements of the existing content, at least one selected from the group consisting of the number of characters in titles of the articles or the number of the titles, the number of characters or rows in bodies of the articles, the number of photographs included in the articles, and the number of tables included in the articles. The existing content information may include, in addition to the above-indicated information, information indicating a feature vector extracted from the title(s) and/or character row(s) of the body(ies) and/or information indicating a genre(s) of the articles.

For example, the content information obtaining section 2002 may analyze the existing content obtained by the data obtaining section 2001, and may extract content information indicating orders of priority of the constituent elements of the existing content and the contents of the constituent elements. For example, the content information obtaining section 2002 may determine, on the basis of a general phenomenon that a constituent element having a higher order of priority is likely to be arranged on an upper right part of a layout target area, orders of priority of the constituent elements according to the arrangement of the constituent elements, and may generate existing content information indicating the orders of priority thus determined.

The content information obtaining section 2002 may obtain existing content information inputted by a user of the layout support system via the input section 203, or may obtain, through communication carried out via the communication section 201, existing content information stored in another apparatus.

The layout information obtaining section 2003 obtains layout information indicating the layout of the existing content obtained by the data obtaining section 2001. For example, the layout information obtaining section 2003 may analyze the existing content obtained by the data obtaining section 2001, may specify positions and ranges of the constituent elements constituting the existing content, and may generate layout information indicating the positions and ranges thus specified. Further, for example, the layout information obtaining section 2003 may obtain the existing content information via the communication section 201 or the input section 203.

The image feature vector extracting section 2005 extracts, from an image generated by the image generating section 2004, an image feature vector indicating a feature of the image. As described with reference to FIG. 3, there is no particular limitation on the method for extracting the image feature vector.

The information accumulation section 2006 stores, in the database 2021, the image feature vector extracted by the image feature vector extracting section 2005 and the layout information obtained by the layout information obtaining section 2003 in such a manner that the image feature vector and the layout information are in association with each other. Further, the information accumulation section 2006 also functions as a training data generating means that generates training data in such a manner that the existing content information obtained by the content information obtaining section 2002 is in association with the image feature vector extracted by the image feature vector extracting section 2005. Note that the training data generating means may be provided independently from the information accumulation section 2006.

As described above, in the database 2021, the image feature vector and the layout information are stored in association with each other. Further, as described above, the database 2021 has the training data stored therein in which the pieces of existing content information and the image feature vectors are in association with each other. Note that the training data may be stored in a database different from the database 2021. Note that the database 2021 may be provided in an apparatus external to the information accumulation apparatus 20.

(Configuration of Layout Support Apparatus)

Figure 5:
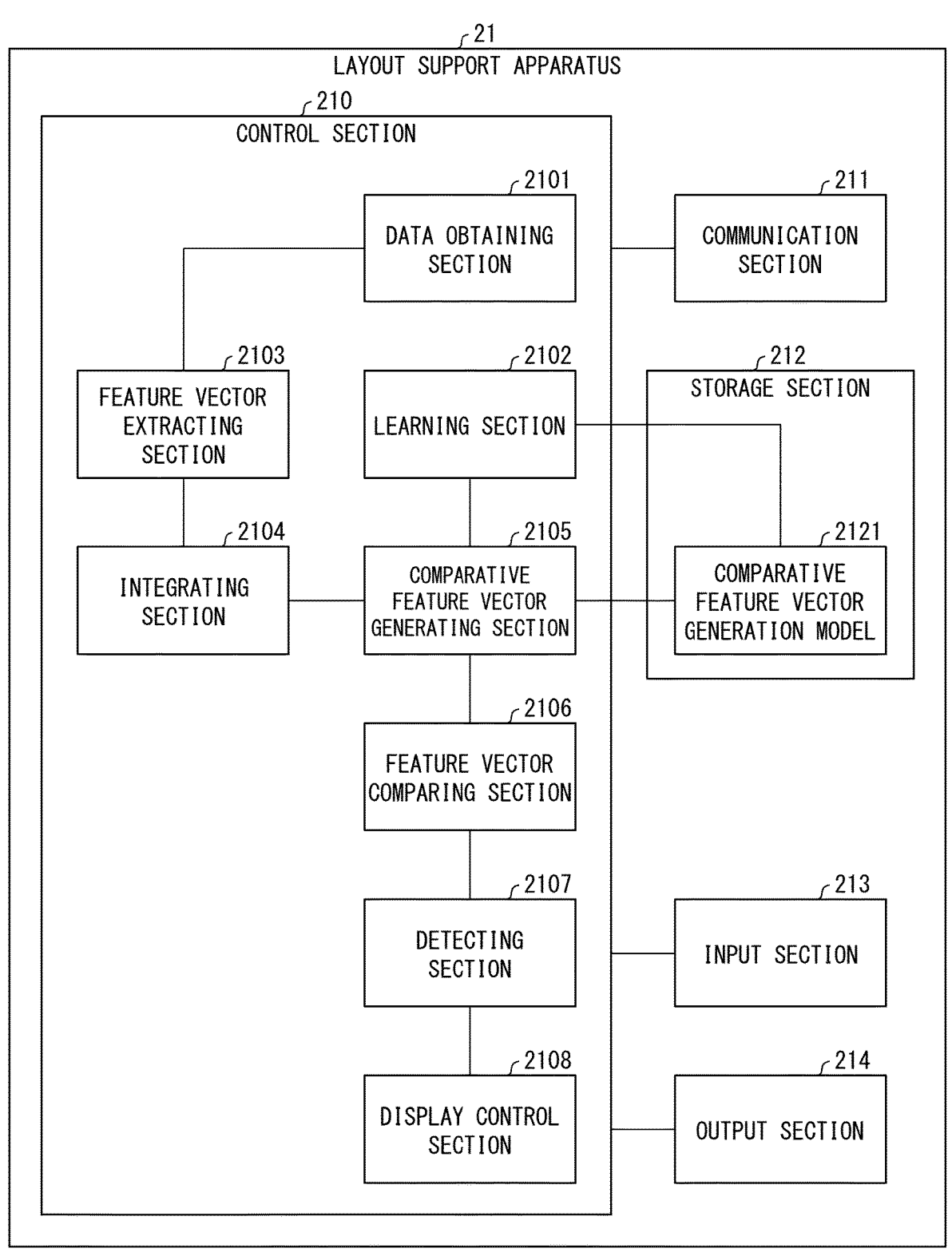
FIG. 5 is a block diagram illustrating an example of a configuration of a layout support apparatus in accordance with the second example embodiment of the present invention.

FIG. 5 is a block diagram illustrating an example of a configuration of the layout support apparatus 21 in accordance with the present example embodiment. The layout support apparatus 21 constitutes, together with the information accumulation apparatus 20 shown in FIG. 4, the layout support system.

As shown in FIG. 5, the layout support apparatus 21 includes: a control section 210 that comprehensively controls sections of the layout support apparatus 21; a communication section 211 via which communication with another apparatus is carried out; a storage section 212 in which various kinds of data is stored; an input section 213 that accepts an input operation: and an output section 214 that outputs data.

The control section 210 includes a data obtaining section 2101, a learning section 2102, a feature vector extracting section 2103, an integrating section 2104, a comparative feature vector generating section 2105, a feature vector comparing section 2106, a detecting section 2107, and a display control section 2108. The storage section 212 has a comparative feature vector generation model 2121 stored therein. Note that the learning section 2102, the feature vector extracting section 2103, the integrating section 2104, the comparative feature vector generating section 2105, and the comparative feature vector generation model 2121 will be explained in "Method for Generating Comparative Feature Vector" described later.

The data obtaining section 2101 obtains target content information of a target content which is a target to be laid out. As described above, the target content information only needs to indicate the orders of priority set to the constituent elements constituting the target content, and may include the information indicating the contents of the constituent elements. Similarly to the above-described existing content information, the information indicating the contents of the constituent elements may be information indicating the number of characters in titles and bodies.

There is no particular limitation on a method for obtaining the target content information. For example, the data obtaining section 2101 may analyze the constituent elements of the target content, may specify the orders of priority set to the constituent elements, the number of characters, and/or the like, and may extract these pieces of information as the target content information. Further, for example, the data obtaining section 2101 may obtain the target content information via the communication section 211 or the input section 213.

The feature vector comparing section 2106 refers to the database 2021 generated by the information accumulation apparatus 20, and calculates similarities between the comparative feature vector generated by the comparative feature vector generating section 2105 and image feature vectors stored in the database 2021. As described above, the similarities may be calculated by any method. Note that the feature vector comparing section 2106 may communicate with the information accumulation apparatus 20 via the communication section 211 so as to refer to the database 2021. The database 2021 may be stored in the storage section 212 in advance.

The detecting section 2107 detects, on the basis of the similarities calculated by the feature vector comparing section 2106, a piece of layout information matching the target content, from among the pieces of layout information of the plurality of existing contents stored in the database 2021. For example, the detecting section 2107 may detect, as the piece of layout information matching the target content, a piece of layout information which is in association with an image feature vector having a highest similarity. For another example, the detecting section 2107 may detect, as the piece of layout information matching the target content, a piece of layout information which is in association with an image feature vector having a similarity not less than a given threshold. Note that the detecting section 2107 may detect, as the piece of layout information matching the target content, a plurality of pieces of layout information.

The display control section 2108 causes display of a detection result of the detecting section 2107. For example, in a case where the output section 214 is a display apparatus, the display control section 2108 causes the output section 214 to display the detection result. The display control section 2108 may cause a display apparatus external to the layout support apparatus 21 to display the detection result.

Specifically, the display control section 2108 may cause display of coordinate values of positions and ranges of constituent elements indicated by the layout information. For another example, the display control section 2108 may cause display of an image in which the positions and ranges of the constituent elements indicated by the layout information are represented by graphics. For further another example, the display control section 2108 may cause display of a preview image in which the constituent elements are arranged in the positions and ranges of the constituent elements indicated by the layout information.

Note that the process of displaying the detection result of the detecting section 2107 is not essential. For example, the detection result of the detecting section 2107 may be stored in the storage section 212 or the like so that the detection result can be utilized as appropriate. In this case, the layout support apparatus 21 may automatically lay out the target content in accordance with the layout information detected by the detecting section 2107.

(Method for Generating Image)

The image generating section 2004 of the information accumulation apparatus 20 generates an image in which (i) a layout of constituent elements of an existing content is represented by graphics indicating positions and ranges of the constituent elements and (ii) orders of priority set to the constituent elements are represented by display modes of the graphics. Consequently, it is possible to attain, in addition to the effect given by the layout support system 1 in accordance with the first example embodiment, an effect of making it possible to automatically generate an image that enables extraction of an image feature vector indicating a layout of constituent elements constituting an existing content and orders of priority set to the constituent elements.

FIG. 6 is a view illustrating an example of generation of an image carried out by the image generating section 2004. FIG. 6 shows two examples, EX1 and EX2. In either of the examples, a target existing content includes five constituent elements A1 to A5, and orders of priority of the constituent elements A1 to A5 are respectively 1 to 5. These pieces of information are obtained by the content information obtaining section 2002 as content information.

Further, as shown in FIG. 6, information indicating positions and ranges of the constituent elements A1 to A5 is extracted by the layout information obtaining section 2003. In the example shown in FIG. 6, the positions and ranges of the constituent elements A1 to A5 are indicated by coordinate values on a coordinate plane indicating a target area in which these constituent elements are to be laid out.

The image generating section 2004 uses the layout information to define the graphics indicating the positions and ranges of the constituent elements A1 to A5 on the plane indicating the layout target area. In the example shown in FIG. 6, each of the constituent elements A1 to A5 is represented by a quadrangle. In FIG. 6, the quadrangles are respectively given numbers (A1 to A5) of the constituent elements corresponding to the quadrangles. EX1 and EX2 use the same layout information. Therefore, the positions and ranges of the quadrangles indicated in EX1 and EX2 are identical to each other.

In EX1, the image generating section 2004 applies, to the graphics corresponding to the constituent elements A1 to A5, fill patterns set to the orders of priority in advance. That is, in the example shown in FIG. 6, a dot pattern, which is a pattern set in advance to a first order of priority, is applied to a graphic corresponding to the constituent element A1 having a first order of priority. Meanwhile, a pattern of lines from bottom left to top right, which is a pattern set in advance to a second order of priority, is applied to a graphic corresponding to the constituent element A2 having a second order of priority. Similarly, predetermined patterns corresponding to the orders are applied also to the constituent elements A3 to A5.

In the image generated in this manner, the positions and ranges of the constituent elements A1 to A5 are represented by the positions and ranges of the graphics, and the orders of priority of the constituent elements A1 to A5 are represented by the display modes of the graphics. Thus, in an image feature vector extracted from such an image, the positions and ranges of the constituent elements A1 to A5, i.e., the layout of the constituent elements A1 to A5 and the orders of priority of the constituent elements A1 to A5 are reflected.

In FIG. 6, the orders of priority are represented by fill patterns (which can also be called "designs" or "textures") for graphics. Alternatively, the orders of priority may be represented by any display modes reflected in an image feature vector. For example, the image generating section 2004 may generate an image including graphics which are respectively filled with colors corresponding to the orders of priority, an image including graphics respectively having luminance values or density values corresponding to the orders of priority, or an image including graphics to which background images corresponding to the orders of priority are attached.

The image generating section 2004 may determine display modes of the graphics on the basis of arrangement of the graphics. In this case, the image generating section 2004 may determine the orders of priority, and the content information obtaining section 2002 may generate content information including information indicating the orders of priority determined by the image generating section 2004.

For example, generally, with regard to a content, a constituent element which has a high significance or which is to pay attention to is often arranged in an upper right part or an upper left part of a layout target area. Therefore, the image generating section 2004 may determine the display modes of the graphics in accordance with the orders of priority of the graphics which are to be arranged in the target area, the orders of priority being determined in order of proximity to a given position in the upper right part of the target area. For example, the image generating section 2004 may calculate distances between a coordinate value of an upper right edge of the target area and coordinate values of upper right edges of the graphics, and may determine the orders of priority in an increasing order of the distance. Similarly, the image generating section 2004 may determine the display modes of the graphics in accordance with the orders of priority of the graphics which are to be arranged in the target area, the orders of priority being determined in order of proximity to the given part in the upper left part of the target area.

Meanwhile, in EX2, the image generating section 2004 applies respective different display modes to graphics corresponding to constituent elements A1 to A4, each of which has a higher order of priority; on the other hand, the image generating section 2004 applies, to a graphic corresponding to a constituent element A5, which has a lower order of priority, a display mode identical to that of the constituent element A4. Specifically, in EX2, the image generating section 2004 applies the respective different display modes to the graphics corresponding to the constituent elements A1 to A3, which have a higher order of priority; on the other hand, the image generating section 2004 applies identical display modes to the graphics corresponding to the constituent elements A4 and A5, each of which has a fourth or lower order of priority.

As described above, the image generating section 2004 may generate an image in which graphics corresponding to a given number of constituent elements having a higher order of priority are indicated by respective different display modes and graphics corresponding to the other constituent elements are indicated by identical display modes.

Generally, among constituent elements of a content, a constituent element having a higher order of priority is positioned at an easy-to-see location for a viewer. Therefore, with regard to such a constituent element, the order of priority and the layout are often highly correlated with each other. Meanwhile, a constituent element having a lower order of priority is positioned, as appropriate, in a remaining space left after constituent elements having a higher order of priority are arranged. Therefore, with regard to such constituent element, the order of priority and the layout are sometimes poorly correlated with each other.

Therefore, with the above configuration, it is possible to attain, in addition to the effect given by the layout support system 1 in accordance with the first example embodiment, an effect of making it possible to detect layout information with which a layout according to an actual layout of an existing content can be reproduced. Note that orders of priority of constituent elements to be given different display modes of graphics may be set as appropriate.

Note that the image generating section 2004 may be omitted, and the image feature vector extracting section 2005 may extract an image feature vector from an image of an existing content (e.g., an image of a paper medium or a web page including information such as news) obtained by the data obtaining section 2001.

(Method for Generating Comparative Feature Vector)

The comparative feature vector generating section 2105 generates a comparative feature vector on the basis of the target content information. The description here will discuss a method for generating a comparative feature vector. As described above, the target content information includes information indicating the orders of priority the constituent elements constituting the target content. Further, assume that the target content information also includes information indicating contents of the constituent elements.

As described with reference to FIG. 3 (particularly, S212), in order to detect layout information matching the target content, the comparative feature vector is compared with the image feature vectors stored in the database 2021, and similarities indicating degrees of similarity between the comparative feature vector and the image feature vectors are calculated.

Thus, the comparative feature vector needs to be a feature vector which can be compared with an image feature vector. However, since the target content is a content for which a layout is to be determined, an image of the target content does not typically exist, and therefore it is impossible to extract an image feature vector from the target content information.

Thus, the comparative feature vector generating section 2105 generates a comparative feature vector with use of a comparative feature vector generation model 2121 obtained by modeling a relation between existing content information and an image feature vector. It can also be said that the comparative feature vector is a prediction value of an image feature vector to be predicted with use of the target content information. The comparative feature vector generated in this manner can be compared with the image feature vectors stored in the database 2021, and similarities between the comparative feature vector and the image feature vectors can also be calculated.

There is no particular limitation on an algorithm of the comparative feature vector generation model 2121. For example, the comparative feature vector generation model 2121 may be a neural network model. Note that, generally, data which is to be input to a learning model should have a fixed length. This applies also to a case where the comparative feature vector generation model 2121 is used as a neural network model. However, the number of constituent elements of the target content can vary.

In order to deal with this, in the layout support apparatus 21, the feature vector extracting section 2103 extracts, from pieces of information relating to the constituent elements indicated by the target content information, feature vectors respectively indicating features of the constituent elements. Then, the integrating section 2104 integrates these feature vectors to generate a feature vector having a given data length (hereinafter, such a feature vector will be called an integrated feature vector).

Consequently, it is possible to generate an integrated feature vector having a given data length, independently of the number of constituent elements constituting the target content information. Then, the comparative feature vector generating section 2105 can generate a comparative feature vector by inputting the integrated feature vector to the comparative feature vector generation model 2121.

Figure 7:
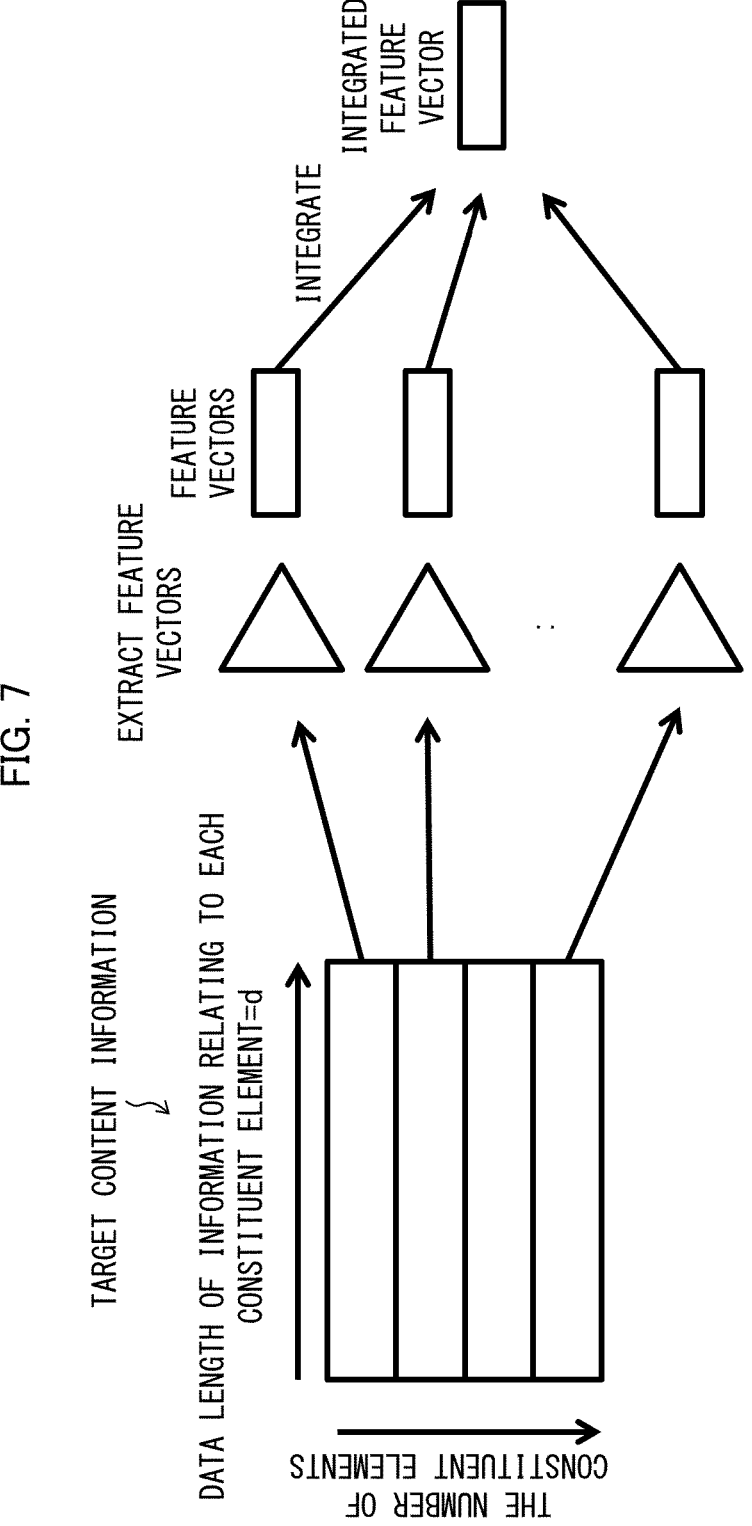
FIG. 7 is a view illustrating an example of generation of an integrated feature vector.

FIG. 7 is a view illustrating an example of generation of an integrated feature vector. For example, in a case where the target content information is represented by a tensor, the pieces of information relating to the constituent elements (e.g., the orders of priority, the number of characters, and/or the like) can be represented in the same data length for the respective constituent elements. Here, the data length is represented as "d". The number of the pieces of information relating to the constituent elements correspond to the number of the constituent elements. Given that the number of the constituent elements is N (N is an integer of not less than 2), the whole of the target content information corresponds to a tensor of a size of d×N. Note that, before extraction of the feature vectors, the pieces of information relating to the constituent elements included in the target content information may be sorted according to the orders of priority of the constituent elements.

The feature vector extracting section 2103 respectively extracts feature vectors from the N constituent elements. There is no particular limitation on a method for extracting the feature vectors. For example, the feature vectors may be extracted with use of a feature vector extraction model such as a neural network. Consequently, the feature vectors corresponding to the respective constituent elements are extracted as shown in FIG. 7. The number of feature vectors to be extracted is N.

Next, the integrating section 2104 integrates the N feature vectors having been extracted into one so as to generate an integrated feature vector. The integrated feature vector is, for example, a tensor of (1×d). There is no particular limitation on a method for integrating the feature vectors. For example, the integrating section 2104 may calculate, as the integrated feature vector, an average of the N feature vectors having been extracted. Further, for example, the integrating section 2104 may use a transformation matrix of a size of (N×1) to convert the N feature vectors into a tensor of (1×d).

Note that the transformation matrixes may be prepared so that the number of the transformation matrixes correspond to the expected number of constituent elements. For example, in a case where the number of the constituent elements of the target content is in a range of 2 to 10, transformation matrixes of a size of (2×1) to a size of (10×1) may be prepared. Further, the transformation matrixes may be optimized by learning. That is, learning may be carried out while repeating a process of randomly selecting the number of constituent elements and learning a parameter matrix corresponding to the selected number of constituent elements. This makes it possible to generate transformation matrixes corresponding to the respective constituent elements.

Figure 8:
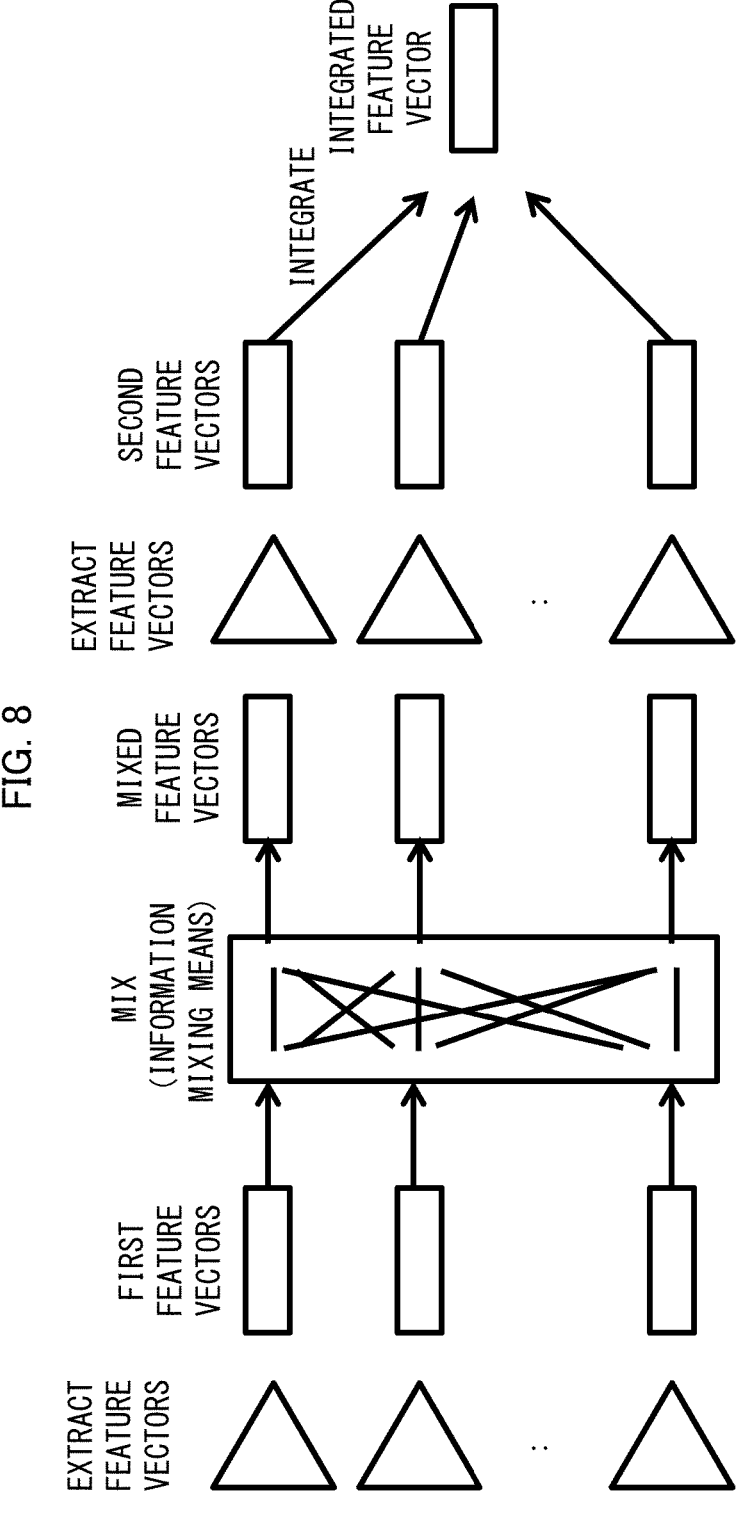
FIG. 8 is a view illustrating another example of generation of an integrated feature vector.

Further, in the process of generating the integrated feature vector from the target content information, the layout support apparatus 21 may mix a plurality of feature vectors respectively extracted from the constituent elements of the target content. This will be described with reference to FIG. 8. FIG. 8 is a view illustrating another example of generation of an integrated feature vector. Similarly to the example of the generation in FIG. 7, also in the example of the generation in FIG. 8, a target from which a feature vector is to be extracted is target content information represented by a tensor of a size of (d×N) (not shown in FIG. 8).

In the example of the generation in FIG. 8, first feature vectors relating to the respective constituent elements are first extracted from the target content information. Extraction of the first feature vectors may be carried out by the feature vector extracting section 2103. Then, the extracted N first feature vectors are mixed in a constituent element direction. Hereinafter, a feature vector obtained by mixing will be called a "mixed feature vector". A plurality of mixed feature vectors are generated. Generation of the mixed feature vector may be executed by an information mixing means added as one of the functional blocks of the control section 210 shown in FIG. 5.

For example, the information mixing means may use a transformation matrix of (N×N) or (N×M) to convert the target content information represented by a tensor of a size of (d×N) into a tensor of a size of (N×d) or (M×d), thereby generating a mixed feature vector. Note that M is an integer of not less than 2 and M≠N. There is no particular limitation on a method for generating a mixed feature vector. For example, the information mixing means may generate a mixed feature vector with use of an algorithm such as Attention.

The plurality of mixed feature vectors generated by the information mixing means may be integrated by the integrating section 2104 so that an integrated feature vector is obtained. Alternatively, as in the example of the generation in FIG. 8, the feature vector may be extracted from the mixed feature vector. In the example of the generation in FIG. 8, second feature vectors are extracted from the mixed feature vectors, and the second feature vectors are integrated by the integrating section 2104 so that an integrated feature vector is generated. In this manner, in a process in which an integrated feature vector is generated from target content information, extraction of a feature vector may be carried out a plurality of times.

There is no particular limitation on a method for extracting the second feature vectors. For example, the feature vectors may be extracted with use of a feature vector extraction model such as a neural network. In this case, a feature vector extraction model which is different from the feature vector extraction model used to extract the first feature vector and which is used to extract a feature vector from a mixed feature vector may be prepared. A means that extracts the second feature vector may be added as one of the functional blocks of the control section 210 shown in FIG. 5.

As described above, the target content information may include information indicating contents of the constituent elements constituting the target content. In this case, the comparative feature vector generating section 2105 may generate a comparative feature vector with use of a comparative feature vector generation model 2121. Note that the comparative feature vector generation model 2121 is generated with use of training data in which the pieces of existing content information indicating the contents of the constituent elements constituting the existing contents are in association with the image feature vectors, and is a model used to generate a comparative feature vector corresponding to the contents of the constituent elements constituting the target content. Consequently, it is possible to generate a comparative feature vector which is a feature vector in which the contents of the constituent elements constituting the target content are reflected and a feature vector that can be compared with an image feature vector.

As described above, the layout support apparatus 21 may include the integrating section 2104 that integrates the feature vectors respectively extracted from the constituent elements of the target content to generate an integrated feature vector of a given data size. In this case, the comparative feature vector generating section 2105 inputs the integrated feature vector to the comparative feature vector generation model 2121 to generate the comparative feature vector.

With this, it is possible to generate a comparative feature vector of a given data size, regardless of the number of constituent elements of the target content. That is, with the above configuration, it is possible to attain, in addition to the effect given by the layout support system 1 in accordance with the first example embodiment, an effect of making it possible to detect appropriate layout information regardless of the number of constituent elements of the target content.

Further, as described above, the layout support apparatus 21 may include an information mixing section that mixes the plurality of feature vectors respectively extracted from the constituent elements of the target content to generate a plurality of mixed feature vectors. In this case, the comparative feature vector generating section 2105 generates an integrated feature vector on the basis of the plurality of mixed feature vectors.

With the above configuration, it is possible to attain, in addition to the effect given by the layout support system 1 in accordance with the first example embodiment, an effect of making it possible to generate an integrated feature vector having a high validity given in consideration of mutual relations between the constituent elements (e.g., a positional relation between a certain constituent element and another constituent element).

(Flow of Process: Information Accumulation Method)

Figure 9:
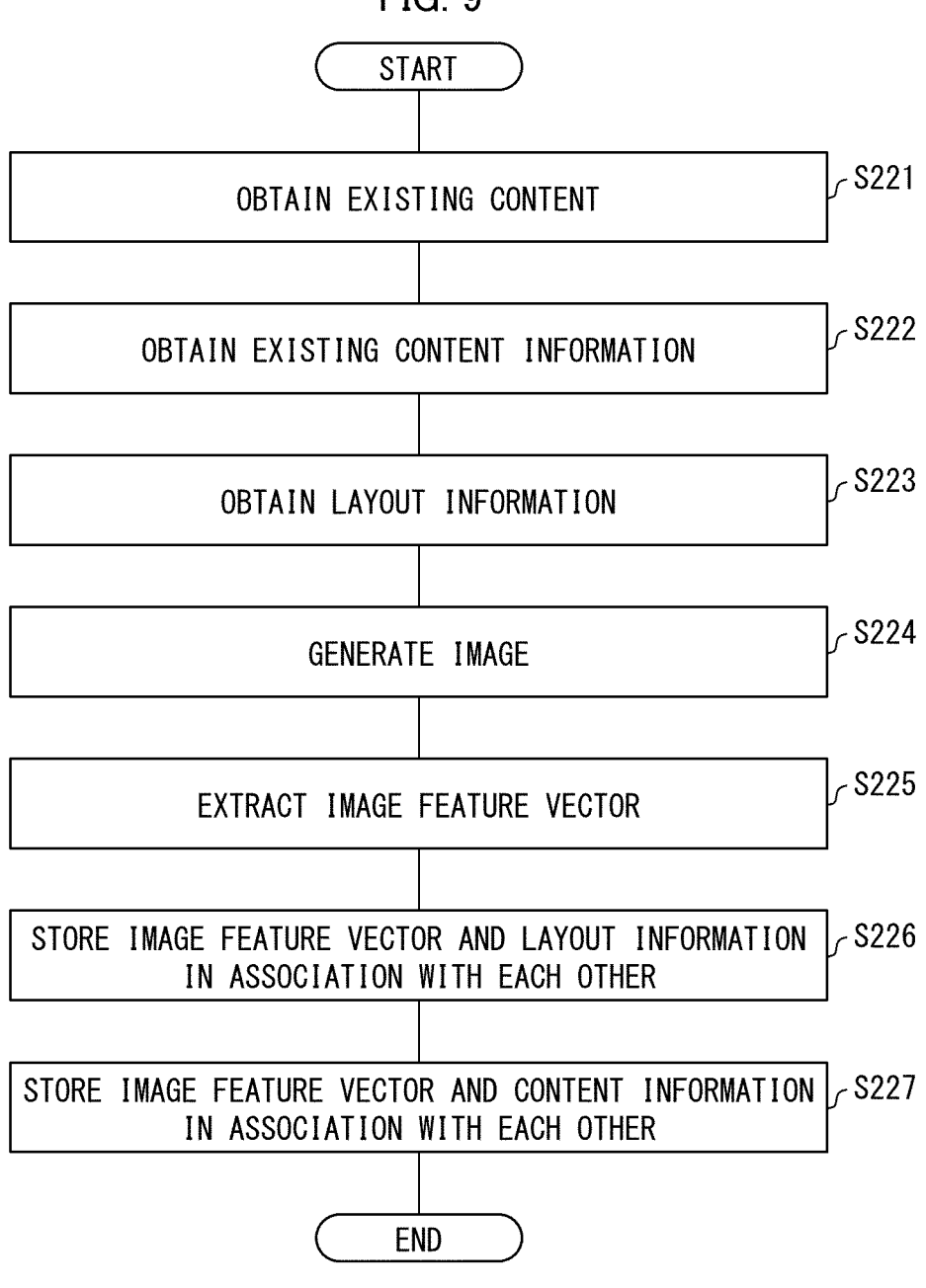
FIG. 9 is a flowchart illustrating a flow of processes executed by the information accumulation apparatus.

The following will describe, with reference to FIG. 9, a flow of processes executed by the information accumulation apparatus 20 (information accumulation method). FIG. 9 is a flowchart illustrating a flow of the process executed by the information accumulation apparatus 20.

In S221, the data obtaining section 2001 obtains an existing content. There is no particular limitation on a method for obtaining the existing content. For example, the data obtaining section 2001 may obtain an existing content from archive data of the existing content as shown in the example in FIG. 3. For another example, the data obtaining section 2001 may obtain an existing content input by a user via the input section 203. For further another example, the data obtaining section 2001 may obtain an existing content via the communication section 201.

In S222, the content information obtaining section 2002 obtains existing content information of the existing content obtained in S221. As described above, the content information obtaining section 2002 may extract the existing content information by analyzing the existing content. The content information obtaining section 2002 may obtain the existing content information via the communication section 201 or the input section 203.

In S223, the layout information obtaining section 2003 obtains layout information of the existing content obtained in S221. As described above, the layout information obtaining section 2003 may analyze the existing content obtained by the data obtaining section 2001, may specify positions and ranges of the constituent elements constituting the existing content, and may generate layout information indicating the positions and ranges thus specified. Further, for example, the layout information obtaining section 2003 may obtain the existing content information via the communication section 201 or the input section 203.

In S224, the image generating section 2004 generates an image in which (i) a layout of constituent elements of an existing content is represented by graphics representing positions and ranges of the constituent elements on the basis of the existing content information obtained in S222 (more specifically, orders of priority of the constituent elements indicated by the existing content information) and the layout information obtained in S223 and (ii) the orders of priority set to the constituent elements are represented by display modes of the graphics.

In S225, the image feature vector extracting section 2005 extracts, from the image generated in S224, an image feature vector indicating a feature of the image.

In S226, the information accumulation section 2006 stores, in the database 2021, the image feature vector extracted in S225 and the layout information obtained in S223 in such a manner that the image feature vector and the layout information are in association with each other. These pieces of information are a target to be searched for by the layout support apparatus 21.

In S227, the information accumulation section 2006 stores, in the database 2021, the image feature vector extracted in S225 and the existing content information obtained in S222 in such a manner that the image feature vector and the existing content information are in association with each other. These pieces of information serve as training data used to generate or update the comparative feature vector generation model 2121. When the processes in S226 and S227 are ended, the processes in FIG. 9 are ended. The above-described processes are executed for each of a plurality of existing contents. The process in S226 and the process in S227 may be integrated, and the image feature vector, the layout information, and the content information may be stored in association with each other.

(Flow of Process: Method for Generating Comparative Feature Vector Generation Model)

Figure 10:
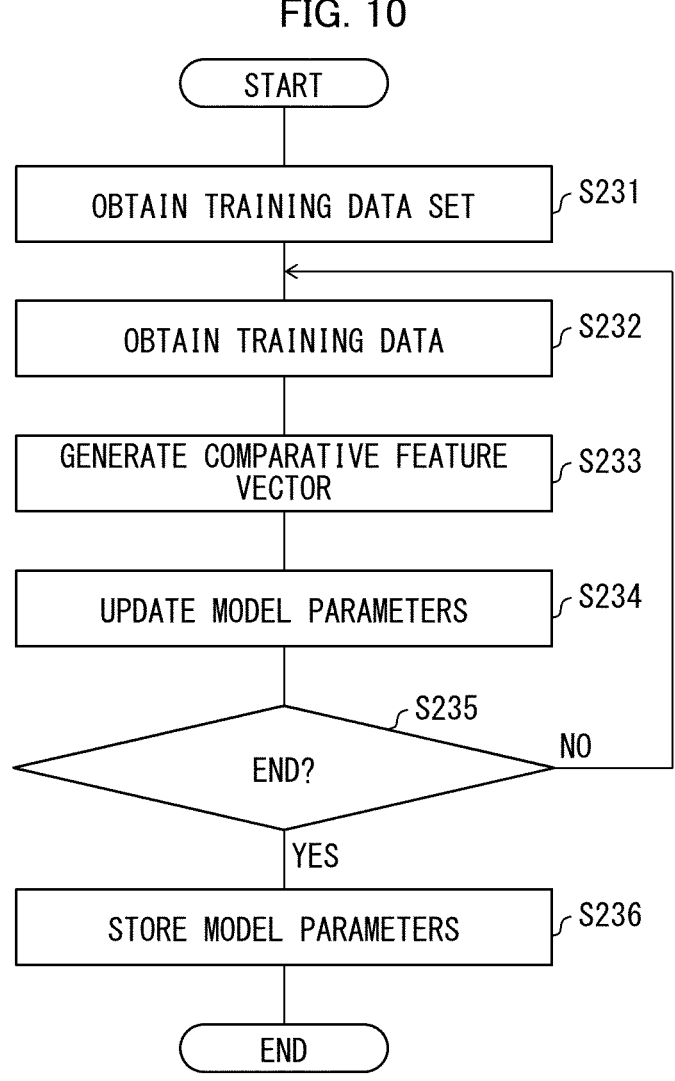
FIG. 10 is a flowchart illustrating a flow of processes to be carried out by the layout support apparatus to generate a comparative feature vector generation model.

The following will describe, with reference to FIG. 10, a flow of processes to be carried out by the layout support apparatus 21 to generate the comparative feature vector generation model 2121 (a method for generating the comparative feature vector generation model). FIG. 10 is a flowchart illustrating a flow of processes to be carried out by the layout support apparatus 21 to generate the comparative feature vector generation model 2121. A similar process is carried out in a case where the comparative feature vector generation model 2121 is updated.

In S231, the learning section 2102 obtains a training data set. The training data set is a data set including a plurality of pieces of training data in which pieces of existing content information are in association with image feature vectors. For example, the learning section 2102 may obtain the training data set from the database 2021 through communication with the information accumulation apparatus 20 via the communication section 211. For another example, the learning section 2102 may obtain the training data set input via the input section 213.

In S232, the learning section 2102 randomly obtains training data of a batch size from the training data set obtained in S231.

In S233, the comparative feature vector generating section 2105 generates, with use of the comparative feature vector generation model 2121 that is in training, a comparative feature vector which is based on the training data obtained in S232. For example, the comparative feature vector generating section 2105 generates the comparative feature vector by inputting, to the comparative feature vector generation model 2121 that is in training, the integrated feature vector generated by the integrating section 2104 integrating feature vectors that the feature vector extracting section 2103 has extracted from the existing content information included in the training data.

In S234, the learning section 2102 updates, on the basis of the comparative feature vector generated in S233, model parameters in the comparative feature vector generation model 2121 that is in training. There is no particular limitation on a method for updating the model parameters. For example, the learning section 2102 may calculate, with use of a loss function, a loss between an image feature vector indicated by the training data obtained in S232 and the comparative feature vector generated in S233. Then, the learning section 2102 may calculate gradients of the model parameters included in the comparative feature vector generation model 2121 on the basis of the loss thus calculated, and may update the model parameters on the basis of the gradients thus calculated. In this case, for example, error back propagation is applicable to calculation of the gradient. Stochastic gradient descent or Adam is applicable to updating of the model parameters.

In S235, the learning section 2102 determines whether to end updating of the model parameters. If the learning section 2102 determines YES in S235, the process advances to S236. Meanwhile, if the learning section 2102 determines NO in S235, the process returns to S232. Note that a condition for ending updating of the model parameters may be determined in advance. For example, the learning section 2102 may end updating of the model parameters under the condition that the number of times of updating reaches a given number.

In S236, the learning section 2102 stores, in the storage section 212, the model parameters having been updated, i.e., the comparative feature vector generation model 2121 having been trained. Then, the processes in FIG. 10 are ended.

(Flow of Process: Layout Support Method)

The following will describe, with reference to FIG. 11, a flow of processes executed by the layout support apparatus 21 for layout support of a target content (layout support method). FIG. 11 is a flowchart illustrating a flow of processes to be executed by the layout support apparatus 21 to carry out layout support of a target content.

In S241, the data obtaining section 2101 obtains target content information. As described above, there is no particular limitation on the method for obtaining the target content information. For example, the data obtaining section 2101 may analyze the constituent elements of the target content (e.g., a title, a body, a photograph, and/or the like which are not laid out) and may extract a resultant as target content information. Further, for example, the data obtaining section 2101 may obtain the target content information via the communication section 211 or the input section 213.

In S242, a comparative feature vector is generated. In S242, for example, the feature vector extracting section 2103 may extract, from the target content information obtained in S241, feature vectors of the constituent elements of the target content, and the integrating section 2104 may integrate the extracted feature vectors to generate an integrated feature vector. Then, the comparative feature vector generating section 2105 may input the integrated feature vector to the comparative feature vector generation model 2121 to generate the comparative feature vector.

In S243, the feature vector comparing section 2106 refers to the database 2021 generated by the information accumulation apparatus 20 and calculates similarities between the comparative feature vector generated in S242 and the image feature vectors stored in the database 2021.

In S244, the detecting section 2107 detects, on the basis of the similarities calculated in S243, a piece of layout information matching the target content, from among the pieces of layout information of the plurality of existing contents stored in the database 2021. Note that, in S243, it is not essential to calculate similarities between the comparative feature vector and all the image feature vectors stored in the database 2021. For example, the feature vector comparing section 2106 may end calculation of the similarities at the point of time when layout information whose similarity is not less than a threshold is detected.

In S245, the display control section 2108 causes the display apparatus to display a result of the detection in S244. Then, the processes in FIG. 11 are ended. Note that the processes may be ended without carrying out the process in S245. Alternatively, the processes may be ended when the detection result in S244 is stored in the storage section 212 or the like.

[Variations]

The processes described in the foregoing example embodiments may be carried out by any entity, which is not limited to the foregoing examples. That is, the layout support system may be constructed by a plurality of apparatuses that are communicable with each other. The plurality of apparatuses are not limited to a combination of the information accumulation apparatus 10 and the layout support apparatus 11 or a combination of the information accumulation apparatus 20 and the layout support apparatus 21.

For example, the functions of the blocks shown in FIG. 1 may be given to respective independent apparatuses. Even with such a configuration, it is possible to construct a layout support system having the same function as that of the layout support system 1. Further, for example, among the blocks of the layout support apparatus 21 shown in FIG. 5, a function (s) of a block(s) relating to generation of the comparative feature vector generation model 2121 may be given to another apparatus different from the layout support apparatus 21. In this case, the layout support apparatus 21 may obtain the comparative feature vector generation model 2121 generated by the another apparatus and may use the comparative feature vector generation model 2121 thus obtained.

A single layout support apparatus having both the function of the information accumulation apparatus 10 and the function of the layout support apparatus 11 can realize a similar function to that of the layout support system 1. Similarly, a single layout support apparatus having both the function of the information accumulation apparatus 20 and the function of the layout support apparatus 21 can also realize a similar function to that of the layout support system in accordance with the second example embodiment.

[Software Implementation Example]

Part of or the whole of functions of the information accumulation apparatuses 10 and 20 and the layout support apparatuses 11 and 21 can be realized by hardware such as an integrated circuit (IC chip) or can be alternatively realized by software.

In the latter case, each of the information accumulation apparatuses 10 and 20 and the layout support apparatuses 11 and 21 is realized by, for example, a computer that executes instructions of a program that is software realizing the foregoing functions. FIG. 12 shows an example of such a computer (hereinafter, referred to as a "computer C"). The computer C includes at least one processor C1 and at least one memory C2. The memory C2 has a program (information accumulation program/layout support program) P stored therein, the program P causing the computer C to operate as the information accumulation apparatus 10, 20 or the layout support apparatus 11, 21. In the computer C, the processor C1 reads and executes the program P from the memory C2, thereby realizing the functions of the information accumulation apparatus 10, 20 or the layout support apparatus 11, 21.

The processor C1 may be, for example, a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of any of them. The memory C2 may be, for example, a flash memory, hard disk drive (HDD), solid state drive (SSD), or a combination of any of them.

The computer C may further include a random access memory (RAM) in which the program P is loaded when executed and various data is temporarily stored. In addition, the computer C may further include a communication interface via which the computer C transmits/receives data to/from another device. The computer C may further include an input-output interface via which the computer C is connected to an input-output device such as a keyboard, a mouse, a display, and/or a printer.

The program P can be stored in a non-transitory, tangible storage medium M capable of being read by the computer C. Examples of the storage medium M encompass a tape, a disk, a card, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

[Supplementary Remarks 1]

The present invention is not limited to the foregoing example embodiments, but can be altered by a skilled person in the art within the scope of the claims. The present invention also encompasses, in its technical scope, any embodiment derived by combining technical means disclosed in differing embodiments.

[Supplementary Remarks 2]

Some or all of the above example embodiments can be described as below. Note, however, that the present invention is not limited to example aspects described below.

(Supplementary Note 1)

A layout support system including: an information accumulation apparatus that executes, for each of a plurality of existing contents, extraction of an image feature vector from an image indicating a layout of constituent elements of the existing content and orders of priority set to the constituent elements and storing, in a database, the image feature vector and a piece of layout information indicating the layout of the constituent elements in such a manner that the image feature vector and the piece of layout information are in association with each other; and a layout support apparatus that calculates similarities between the image feature vectors stored in the database and a comparative feature vector generated on a basis of target content information indicating at least orders of priority set to constituent elements constituting a target content which is a target to be laid out and detects, on a basis of the similarities, a piece of layout information matching the target content, from among the pieces of layout information stored in the database.

(Supplementary Note 2)

The layout support system described in Supplementary Note 1, wherein: the information accumulation apparatus includes an image generating means that generates the images in each of which (i) the layout of the constituent elements of a corresponding one of the plurality of existing contents is represented by graphics indicating positions and ranges of the constituent elements and (ii) the orders of priority set to the constituent elements are represented by display modes of the graphics.

(Supplementary Note 3)

The layout support system described in Supplementary Note 2, wherein: the image generating means generates the images in each of which (i) graphics corresponding to a given number of constituent elements each having a higher order of priority are represented by respective different display modes and (ii) graphics corresponding to the other constituent elements are represented by identical display modes.

(Supplementary Note 4)

The layout support system described in any one of Supplementary Notes 1 to 3, wherein: the target content information includes information indicating contents of the constituent elements constituting the target content; and the layout support apparatus includes a comparative feature vector generating means that generates the comparative feature vector with use of a comparative feature vector generation model (i) that is generated with use of training data in which pieces of existing content information each indicating contents of constituent elements constituting a corresponding one of the plurality of existing contents are in association with the image feature vectors and (ii) that is used to generate the comparative feature vector corresponding to the contents of the constituent elements constituting the target content.

(Supplementary Note 5)

The layout support system described in Supplementary Note 4, wherein: the layout support apparatus includes an integrating means that integrates the feature vectors respectively extracted from the constituent elements of the target content to generate an integrated feature vector of a given size, and the comparative feature vector generating means inputs the integrated feature vector to the comparative feature vector generation model to generate the comparative feature vector.

(Supplementary Note 6)

The layout support system described in Supplementary Note 5, further including an information mixing means that mixes the feature vectors respectively extracted from the constituent elements of the target content to generate a plurality of mixed feature vectors, and the comparative feature vector generating means generates the integrated feature vector on a basis of the plurality of mixed feature vectors.

(Supplementary Note 7)

A layout support apparatus including: a feature vector comparing means that carries out, for each of a plurality of existing contents, (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other and (b) calculating similarities between the image feature vectors stored in the database and a comparative feature vector generated on a basis of target content information indicating at least orders of priority set to constituent elements constituting a target content which is a target to be laid out; and a detecting means that detects, on a basis of the similarities, a piece of layout information matching the target content, from among the pieces of layout information of the plurality of existing contents.

(Supplementary Note 8)

An information accumulation apparatus including an image feature vector extracting means that extracts, for each of a plurality of existing contents, an image feature vector from an image indicating (i) a layout of constituent elements constituting the existing content and (ii) orders of priority set to the constituent elements; and an information accumulating means that stores, in a database, the image feature vectors and pieces of layout information each indicating the layout of the constituent elements in such a manner that the image feature vectors and the pieces of layout information are in association with each other.

(Supplementary Note 9)

A layout support method including: at least one processor carrying out, for each of a plurality of existing contents, (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other and (b) calculating similarities between the image feature vectors stored in the database and a comparative feature vector generated on a basis of target content information indicating at least orders of priority set to constituent elements constituting a target content which is a target to be laid out; and at least one processor detecting, on a basis of the similarities, a piece of layout information matching the target content, from among the pieces of layout information of the plurality of existing contents.

(Supplementary Note 10)

A layout support program causing a computer to function as: a feature vector comparing means that carries out, for each of a plurality of existing contents, (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other and (b) calculating similarities between the image feature vectors stored in the database and a comparative feature vector generated on a basis of target content information indicating at least orders of priority set to constituent elements constituting a target content which is a target to be laid out; and a detecting means that detects, on a basis of the similarities, a piece of layout information matching the target content, from among the pieces of layout information of the plurality of existing contents.

(Supplementary Note 11)

A layout support apparatus including at least one processor, the at least one processor executing: a process pf carrying out, for each of a plurality of existing contents, (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other and (b) calculating similarities between the image feature vectors stored in the database and a comparative feature vector generated on a basis of target content information indicating at least orders of priority set to constituent elements constituting a target content which is a target to be laid out; and a process of detecting, on a basis of the similarities, a piece of layout information matching the target content, from among the pieces of layout information of the plurality of existing contents.

Note that the layout support apparatus may further include a memory. The memory may have a layout support program stored therein, the layout support program causing the processor to execute the processor of calculating the similarities and the process of detecting the piece of layout information matching the target content. Further, the layout support program may be stored in a computer-readable, non-transitory, tangible storage medium.

(Supplementary Note 12)

An information accumulation apparatus including at least one processor, the at least one processor executing a process of extracting, for each of a plurality of existing contents, an image feature vector from an image indicating (i) a layout of constituent elements constituting the existing content and (ii) orders of priority set to the constituent elements; and a process of storing, in a database, the image feature vectors and pieces of layout information each indicating the layout of the constituent elements in such a manner that the image feature vectors and the pieces of layout information are in association with each other.

Note that the information accumulation apparatus may further include a memory. The memory may have an information accumulation program stored therein, the information accumulation program causing the processor to execute the process of extracting the image feature vectors and the process of storing the image feature vectors in the database. Further, the information accumulation program may be stored in a computer-readable, non-transitory, tangible storage medium.

REFERENCE SIGNS LIST

1: layout support system
10: information accumulation apparatus
101: image feature vector extracting section
102: information accumulation section
11: layout support apparatus
111: feature vector comparing section
112: detecting section
20: information accumulation apparatus
2004: image generating section
2005: image feature vector extracting section
2006: information accumulation section
2021: database
21: layout support apparatus
2104: integrating section
2105: comparative feature vector generating section
2106: feature vector comparing section
2107: detecting section

The invention claimed is:

1. A layout support system comprising:
an information accumulation apparatus that includes at least one processor, the at least one processor executing, for each of a plurality of existing contents, a process of extracting an image feature vector from an image indicating a layout of constituent elements of the existing content and orders of priority set to the constituent elements and a process of storing, in a database, the image feature vector and a piece of layout information indicating the layout of the constituent elements in such a manner that the image feature vector and the piece of layout information are in association with each other; and
a layout support apparatus that includes at least one processor, the at least one processor executing a process of calculating similarities between the image feature vectors stored in the database and a comparative feature vector generated on a basis of target content information indicating at least orders of priority set to constituent elements constituting a target content which is a target to be laid out and a process of detecting, on a basis of the similarities, a piece of layout information matching the target content, from among the pieces of layout information stored in the database, wherein the at least one processor of the layout support apparatus is further configured to:
extract, from the target content information, feature vectors respectively corresponding to the constituent elements of the target content;
mix the feature vectors to generate a plurality of mixed feature vectors;
integrate the plurality of mixed feature vectors to generate an integrated feature vector of a given data size; and
generate the comparative feature vector on a basis of the integrated feature vector.

2. The layout support system according to claim 1, wherein:
the at least one processor of the information accumulation apparatus executes an image generating process of generating the images in each of which (i) the layout of the constituent elements of a corresponding one of the plurality of existing contents is represented by graphics indicating positions and ranges of the constituent elements and (ii) the orders of priority set to the constituent elements are represented by display modes of the graphics.

3. The layout support system according to claim 2, wherein:
in the image generating process, the at least one processor of the information accumulation apparatus generates the images in each of which (i) graphics corresponding to a given number of constituent elements each having a higher order of priority are represented by respective different display modes and (ii) graphics corresponding to the other constituent elements are represented by identical display modes.

4. The layout support system according to claim 1, wherein:
the target content information includes information indicating contents of the constituent elements constituting the target content; and
the at least one processor of the layout support apparatus executes a comparative feature vector generating process of generating the comparative feature vector with use of a comparative feature vector generation model (i) that is trained through machine learning using training data in which pieces of existing content information each indicating contents of constituent elements constituting a corresponding one of the plurality of existing contents are in association with the image feature vectors and (ii) that is used to generate the comparative feature vector corresponding to the contents of the constituent elements constituting the target content.

5. The layout support system according to claim 4, wherein:
the at least one processor of the layout support apparatus executes an integrating process of integrating the feature vectors respectively extracted from the constituent elements of the target content to generate an integrated feature vector of a given data size, and
in the comparative feature vector generating process, the at least one processor of the layout support apparatus inputs the integrated feature vector to the comparative feature vector generation model to generate the comparative feature vector.

6. The layout support system according to claim 5, wherein:
the at least one processor of the layout support apparatus executes an information mixing process of mixing the feature vectors respectively extracted from the constituent elements of the target content to generate a plurality of mixed feature vectors, and in the comparative feature vector generating process, the at least one processor of the layout support apparatus generates the integrated feature vector on a basis of the plurality of mixed feature vectors.

7. A layout support apparatus comprising at least one processor, the at least one processor executing:

for each of a plurality of existing contents, a feature vector comparing process of (a) referring to a database in which pieces of layout information each indicating a layout of constituent elements constituting a corresponding one of the plurality of existing contents and image feature vectors each extracted from an image indicating the layout and orders of priority set to the constituent elements are stored in association with each other; and (b) calculating similarities between the image feature vectors stored in the database and a comparative feature vector generated on a basis of target content information indicating at least orders of priority set to constituent elements constituting a target content which is a target to be laid out;

a detecting process of detecting, on a basis of the similarities, a piece of layout information matching the target content, from among the pieces of layout information of the plurality of existing contents; and a comparative feature vector generating process comprising:

extracting, from the target content information, feature vectors respectively corresponding to the constituent elements of the target content;

mixing the feature vectors to generate a plurality of mixed feature vectors;

integrating the plurality of mixed feature vectors to generate an integrated feature vector of a given data size; and generating the comparative feature vector on a basis of the integrated feature vector.

8. A non-transitory, computer-readable storage medium in which a program is stored, the program causing a computer to function as a layout support apparatus recited in claim 7, and the program causing the computer to execute the feature vector comparing process and the detecting process.

* * * * *